Patented Sept. 26, 1922.

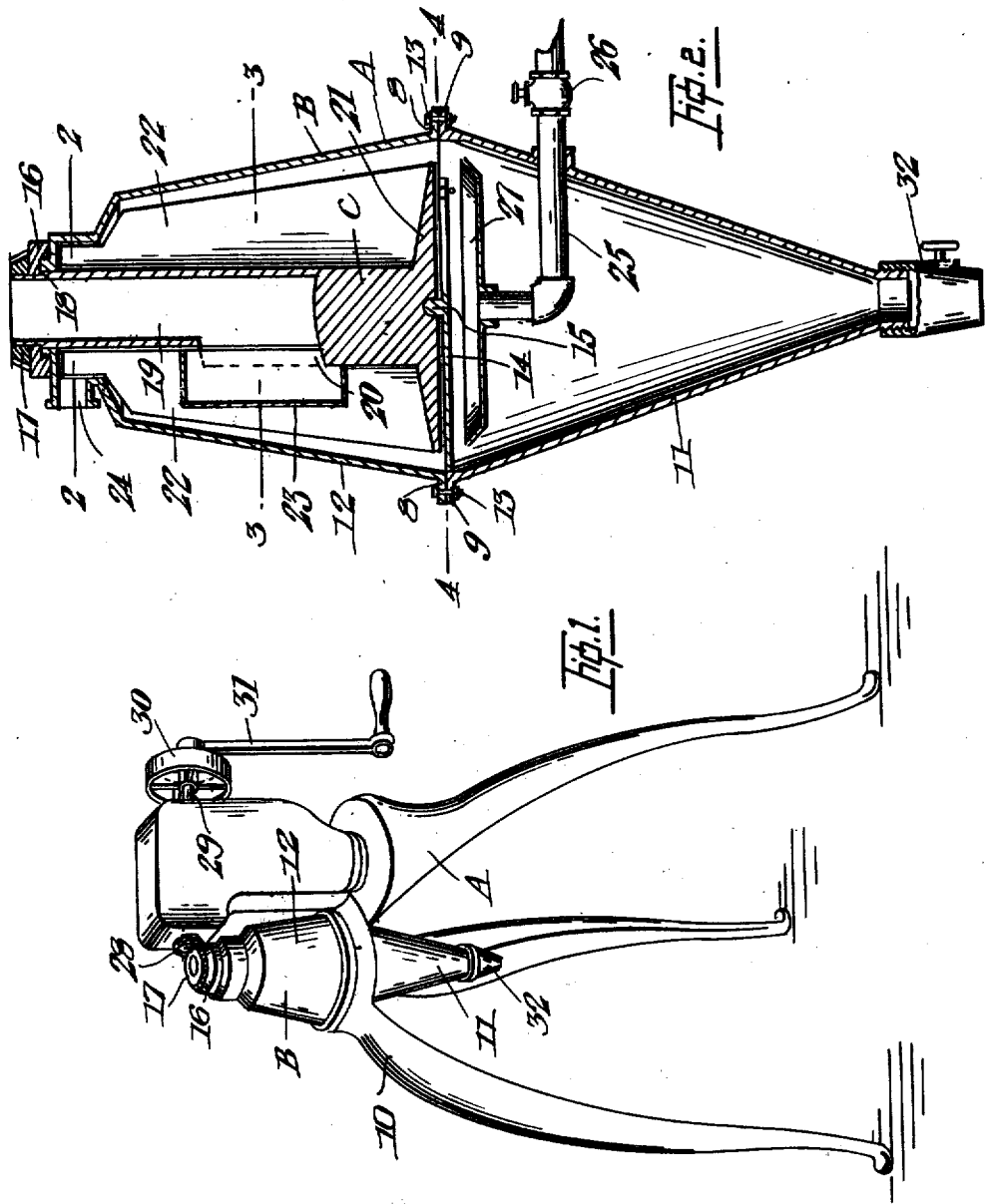

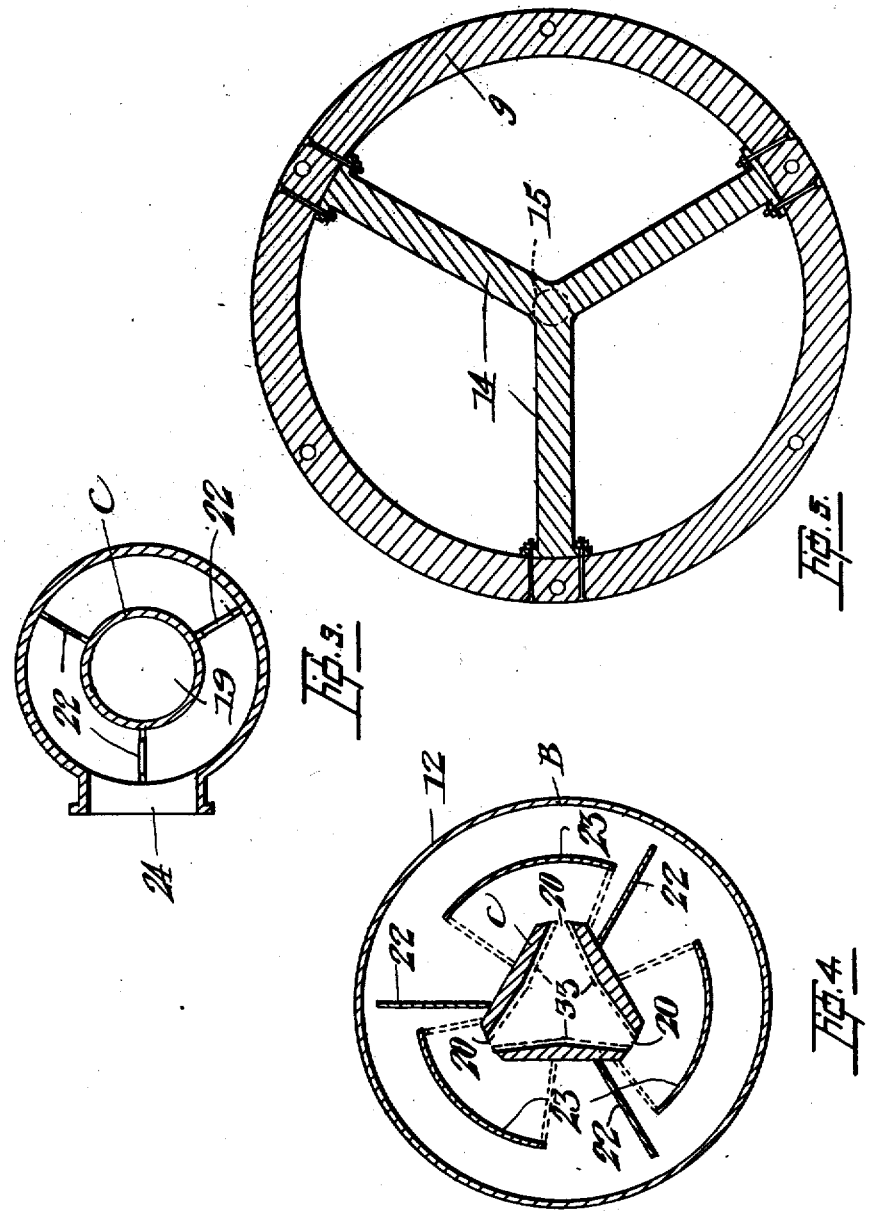

1,430,293

UNITED STATES PATENT OFFICE.

EDGAR DUNCOMBE EDDY, OF OTTAWA, ONTARIO, CANADA.

GRAIN AND SEED GRADER AND SEPARATOR.

Application filed February 13, 1920. Serial No. 358,344.

*To all whom it may concern:*

Be it known that I, EDGAR DUNCOMBE EDDY, a subject of the King of Great Britain, a resident of the city of Ottawa, Province of Ontario, Dominion of Canada, have invented certain new and useful Improvements in Grain and Seed Graders and Separators, of which the following is a specification.

This invention relates to improvements in grain and seed graders and separators, and the objects of the invention are to facilitate separating seeds of weeds from those of cultivated plants, different kinds of grain and other crop seeds from each other, different grades or qualities of the same kind of grain or seed and smut spores, chaff, dirt and other foreign matter from grain and seeds, in such a manner that the stock being treated will be separated into two grades based on comparative specific gravity which grades will be discharged from the machine at different points thereof; to permit of combining centrifugal and flotation systems being utilized which assures an effective separation of the lighter portion of the stock from the heavier portion; to simplify the construction of the machine whereby the several parts are easily assembled and disassembled; and to permit of the machine being actuated either by hand or power depending on the capacity and size of the machine required.

Further objects are to so control the delivery to and discharge from the machine of the liquid used that when the separation of the heavier portion of the stock from the lighter portion is affected by centrifugal force, the heavier portion will be carried to a lower outlet by gravity and a liquid current where it will be continuously discharged, while the lighter portion, which will be of less specific gravity than the liquid will be continuously carried upwardly by flotation and a liquid current to another outlet, so that a proper separation is thus effected; to provide means for maintaining centrifugal force upon and agitating the liquid and stock to be separated, to provide baffle means for maintaining the stock a sufficient length of time in suspension in the liquid to permit of the desired separation taking place, and generally to adapt the several parts to better perform the functions required of them.

With the above and other objects in view, the invention consists essentially of the improved construction particularly described and set forth in the following specification and accompanying drawings forming part of the same.

In the drawings:

Figure 1 is a perspective view of the improved grain and seed cleaner and separator.

Figure 2 is an enlarged vertical section through the body portion of the separator.

Figure 3 is an enlarged transverse section on the line 3—3 of Figure 2.

Figure 4 is an enlarged transverse section on the line 4—4 of Figure 2.

Figure 5 is an enlarged transverse section on the line 5—5 of Figure 2.

Like characters of reference refer to like parts in the several figures.

Referring to the drawings; A represents the improved grain and seed cleaner and separator comprising a frame 10 on which the body portion B of the separator is mounted.

This body portion consists of a casing formed of a lower inverted conical portion 11, and an upper portion 12 formed like a frustum of a cone, the portions 11 and 12 having annular flanges 8 and 9 which abut and are adapted to be secured together by clamps or bolts 13.

A spider 14 is mounted between the upper and lower portions 11 and 12 of the casing B, being attached to 11, and is provided with a centre step bearing 15, on which the lower end of the rotor C is journalled, the upper end of the rotor extending through the upper portion 12 of the casing.

The rotor C is journalled centrally within the upper portion 12 of the casing B, and a nut 16 which makes threaded engagement with the upper threaded end of the said portion, and the portion of the rotor projecting beyond the nut 16 is provided with a bevelled gear 17 suitably secured thereon.

Endwise or vertical motion of the rotor C is eliminated by providing a shoulder 18 with which the nut 16 engages, and the rotor is formed with a central conduit 19 which is provided adjacent to the lower end with a plurality of peripheral outlets 20.

The rotor C is formed on the lower end with an annular flange 21 and a plurality of radial vanes 22 are provided, the outer edges of which are slightly spaced from the inner periphery of the upper portion 12 of the casing B.

A plurality of baffle walls 23 are located in front of the outlets 20, and these baffle walls are curvilinear and eccentrically arranged for an object which will be made clear hereafter. They are attached to the rotor by braces at the top and bottom.

Adjacent to the upper end portion 12 of the casing B a lateral discharge conduit 24 is provided, and in the lower portion 11 of the casing an inlet fluid conduit 25 is provided having a valve 26 which controls the flow of the fluid.

The discharge end of this conduit 25 is disposed towards the rotor C, and a guide plate 27 is spaced from the spider and the lower end of the rotor and designed to deliver the stream of liquid at or near the juncture of portions 11 and 12 of the casing.

To facilitate rotating the rotor I have shown a gear 28 which meshes with the gear 17, and this gear 28 may be mounted on a shaft 29 which is provided with a belt pulley 30 and a hand crank 31.

On the lower end of the portion 11 of the casing a discharge valve 32 is provided.

When the machine is in use and stock is to be treated, the stock may or may not be mixed with a liquid, and a liquid of predetermined density will be delivered through the conduit 25 into the interior of the casing B.

This liquid will be guided by the plate 27 and will not have any tendency to fall directly to the valve 32 under gravity, but will be discharged latterly over the plate, thus creating a downward current around the inner wall of the casing 11 which assists gravity in carrying the heavy portion of the stock being separated to the lower discharge valve 32.

The rotor C is set in motion either by the hand crank 31 or by connecting the pulley 30 by a belt to a suitable prime mover.

When the speed of the rotor has reached a predetermined limit, liquid of the desired density is let into the casing by the conduit 25 or both conduits 25 and 19 in sufficient volume to maintain a flow from the discharge conduit 24, while the valve 32 is open as wide as is desired.

By the rapid revolving of the rotor the liquid in portion 12 of the casing is subjected to centrifugal pressure and forms a cylinder, the inside wall of which is on a vertical line with the inner point of the conduit 24. The stock to be treated either dry or with a proportion of liquid the same as is delivered through the conduit 25, will be delivered to the conduit 19, where it comes under centrifugal action, and will be discharged through the peripheral openings 20, when it will enter the column of liquid and impact slightly on the baffle walls 23 and be directed towards the discharge or outer edge of the said baffle walls.

During this rotation of the rotor the stock will be kept in a state of centrifugal pressure and agitation by the vanes 22, so that any air which envelopes the seed will be liberated and there will be no tendency for heavier seeds to be carried to the inner wall of the liquid and upwardly by flotation, due to being wholly or partially enveloped in globules of air. I have found that by flotation without centrifugal pressure the desired separations are interfered with by air envelopes and surface tension which causes some seeds of greater specific gravity than the liquid to float and permits light and heavy seeds to be held together in clusters, thus preventing proper separations by gravity alone.

During this rotary motion of the rotor C the stock will be separated into cones of different densities the portion having a higher specific gravity than the liquid being at the outer edge of the vanes 22, and from there being passed downward along the inner wall of the casing 12 to the juncture of the lower portion 11 where the centrifugal force ceases and the heavy separation is carried by gravity and the current of liquid to discharge valve 32.

It will be evident that distinct cones of the stock being treated will be formed, and while the outer and heavier portion of the stock descends under current and gravity, the inner cone of the portion of less specific gravity than the liquid will travel upwardly with the opposite current and by flotation until it reaches the discharge conduit 24, where it is discharged with the liquid from the side of the casing B.

Different types of stock would require different size apertures 20 in the conduit 19, and to permit of different grains being treated by the same machine I have provided inserts 33 which may be placed in the conduit 19, so as to reduce the effective area of the apertures 20, and the stock will enter the casing B with a predetermined feed best calculated to give effective results in separation.

The valve 26 can be adjusted to permit of the desired volume of liquid entering the casing B to effect a proper separation of the stock, and the valve 32 will be adjusted to allow the heavier separation being drawn off in a continuous stream.

The specific gravity of the liquid is varied according to the comparative weights of the seeds to be separated. A suitable material for making a liquid the desired density is sodium nitrate but other substances may be used. With seeds weighing about sixty pounds per measured bushel such as wheat and clovers a solution from 40 to 50 parts sodium nitrate to 100 parts water by weight is suitable.

The best specific gravity or point of density varies with different kinds of seeds, and even different lots of the same kind of seed, and the degree of the separation desired. By regulating the density of the liquid, the relative proportion of the seeds which goes into the heavy and light separations is under perfect control.

With a sample of clover seeds for instance, all weed seeds and other foreign matter as well as shrunken, immature and light weight clover seeds of a lower specific gravity than the liquid are separated from those seeds which are as heavy as, or heavier than the liquid.

The proportion of clover seeds which will go into the light separation can be regulated accurately as may be desired, depending upon the characters of the sample and the separation needed. The following are illustrations of the separations which are made by varying the density of the liquid: (a) wild mustard, foxtail, thistle and other weed seeds and light weight, shrunken clover seeds from good clover seeds, (b) timothy and other grass seed from clover seed, (c) hulled from unhulled timothy seed, (d) oats and barley from wheat, (e) wheat and barley from oats, (f) oats and wheat from barley, (g) different grades or qualities, based on weight of one kind of seed, (h) smut spores and other undesirable foreign matter from different kinds of seed.

In the embodiment illustrated I have shown a direct train drive with two bevel gears, but it will be understood that any train of gearing may be utilized, or any mechanism equivalent, whereby the desired speed of the rotor C will be obtained which will give the best results to effect a proper separation and cleaning of the stock being treated.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. An apparatus for grading and cleaning grain and seeds comprising a casing, a rotor rotatably mounted in the casing, peripheral vanes on the rotor, means for delivering stock to be treated axially of the rotor, means for delivering liquid to the casing, and curvilinear baffle walls eccentrically located between the vanes.

2. An apparatus for separating grain and seeds comprising a casing, a rotor therein provided with a central conduit having radial discharge passages leading therefrom, baffle plates supported by the rotor opposite and in spaced relation to said passages, and vanes extending between said baffles.

3. An apparatus for separating grain comprising a casing, a rotor therein comprising a vertically disposed body portion having a central conduit and substantial radial passages communicating with the lower end of the conduit and providing outlets therefor, vanes extending longitudinally of the body portion between said passages, baffle plates extending between said vanes in spaced relation to the body portion and opposite the passages, a spider in the casing supporting the lower end of said body, a pan below the spider and a fluid supply conduit discharging centrally into said pan.

4. In an apparatus for separating grain and seed, a closed liquid filled casing, a seed and liquid receiving hollow ported impeller rotatably mounted in the liquid filled casing, said casing having an upper neck of a radius intermediate between the radius of the casing and the radius of the hollow portion of the impeller concentric therewith, and communicating with an upper discharge orifice, and means on the impeller for rotating that portion of the liquid in the liquid filled casing disposed above the base of the impeller at sufficient speed to maintain a concentric hollow column of liquid under substantial pressure with its inner wall on a radius substantially coincident with the radius of the neck of the casing.

5. In an apparatus for separating grain and seed, a closed liquid filled casing, a hollow ported impeller, the upper portion of the casing being of frusto-conical shape terminating in a concentric upper neck of reduced diameter communicating with an upper discharge orifice, the radius of the neck being intermediate between the radius of the upper portion of the casing and the radius of the hollow portion of the ported impeller, and means on the impeller for rotating that portion of the liquid in the liquid filled casing disposed above the base of the impeller at sufficient speed to maintain a concentric hollow column of liquid under substantial pressure with its inner wall on a radius substantially coincident with the radius of the neck.

6. A method of separating seeds and the like, consisting in introducing the seeds centrally into a chamber containing a hollow column of liquid under centrifugal action and pressure, counterbalancing said pressure by a liquid body independently introduced into the chamber thus producing in the hollow column of liquid an outer substantially quiescent zone wherein the seeds are separated radially on the basis of their comparative specific gravities.

7. A method of separating seeds and the like, consisting in introducing the seeds centrally into a chamber containing a hollow column of liquid under centrifugal action and pressure, counterbalancing said pressure by a liquid body independently introduced into the chamber, thus producing in the hollow column of liquid an outer substantially quiescent zone wherein the seeds are separated radially on the basis of their comparative specific gravities, producing in the hollow column of liquid an inner zone of upward current wherein the lighter seeds are continuously discharged.

8. A method of separating seeds and the like, consisting in introducing the seeds centrally into a chamber containing a hollow column of liquid under centrifugal action and pressure, counterbalancing said pressure by a liquid body independently introduced into the chamber, producing in the hollow column of liquid an outer substantially quiescent zone wherein the seeds are separated radially on the basis of their comparative specific gravities, thus producing in the hollow column of liquid an inner zone of upward current wherein the lighter seeds are continuously discharged, directing the heavier seeds from the outer quiescent zone of said liquid column into the liquid body counteracting the pressure of the liquid column and continuously discharging them therefrom.

9. A method of separating seeds and the like consisting in introducing the seeds and liquid centrally into a chamber containing a hollow column of liquid under centrifugal action and pressure, counterbalancing the pressure of said liquid column by a liquid body communicating therewith and independently introduced, thus providing a substantially quiescent outer zone and an inner zone of upward current in said liquid column, projecting the seeds in the body of said quiescent zone and separating them therein by centrifugal action, displacing the seeds of specific gravity less than that of the liquid to the inner zone of upward current and continuously discharging them thereby, directing the heavier seeds into the liquid body which balances the pressure of the liquid column and continuously discharging them therefrom.

10. A method of separating seeds and the like, according to claim 9, wherein substantially all the liquid introduced into the chamber with the liquid is discharged through an upper outlet with the lighter components of the separation and substantially all the liquid introduced independently is discharged with the heavier components of the separation through a lower outlet in the chamber.

11. A method of separating seeds and the like, according to claim 9, wherein the admission of the independently introduced liquid is regulated to control its flow relatively to the flow of the liquid introduced with the seeds, and the establishment of a liquid zone under centrifugal action substantially quiescent wherein the separation of the seeds takes place.

In witness whereof I have hereunto set my hand.

EDGAR DUNCOMBE EDDY.